(12) United States Patent
Nelson

(10) Patent No.: US 8,441,159 B2  
(45) Date of Patent: May 14, 2013

(54) SELF-LATCHING SECTOR MOTOR FOR PRODUCING A NET TORQUE THAT CAN BE BACKED-UP OR DOUBLED

(76) Inventor: Victor Nelson, Deer Park, NY (US)

(*) Notice: Subject to any disclaimer, the term of this patent is extended or adjusted under 35 U.S.C. 154(b) by 347 days.

(21) Appl. No.: 12/803,944

(22) Filed: Jul. 9, 2010

(65) Prior Publication Data

US 2012/0007451 A1 Jan. 12, 2012

(51) Int. Cl.
  *H02K 33/18* (2006.01)
  *H02K 33/16* (2006.01)
(52) U.S. Cl.
  USPC .......................................... 310/36; 310/49.55
(58) Field of Classification Search ............... 310/36, 310/37–39, 49.01, 49.51, 49.53, 49.55; *H02K 33/12, H02K 33/16, 33/18*
  See application file for complete search history.

(56) References Cited

U.S. PATENT DOCUMENTS

| | | | |
|---|---|---|---|
| 3,761,851 A | 9/1973 | Nelson | |
| 3,970,980 A | 7/1976 | Nelson | |
| 4,287,457 A * | 9/1981 | Takemura | 310/36 |
| 4,500,861 A | 2/1985 | Nelson | |
| 4,795,929 A | 1/1989 | Elgass | |
| 4,847,526 A | 7/1989 | Takehara | |
| 6,518,685 B2 | 2/2003 | Nelson | |
| 6,967,422 B2 * | 11/2005 | Nelson | 310/39 |
| 2002/0093265 A1 | 7/2002 | Nelson | |
| 2004/0021390 A1 | 2/2004 | Kim | |
| 2005/0116800 A1 * | 6/2005 | Nelson | 310/36 |
| 2006/0255664 A1 * | 11/2006 | Kraus et al. | 310/36 |
| 2007/0018513 A1 * | 1/2007 | Yamamoto et al. | 310/49 R |
| 2009/0261680 A1 | 10/2009 | Oki | |
| 2009/0295251 A1 | 12/2009 | Vollmer | |

* cited by examiner

*Primary Examiner* — Tran N. Nguyen  
*Assistant Examiner* — Michael Andrews  
(74) *Attorney, Agent, or Firm* — Charles E. Baxley

(57) ABSTRACT

A self-latching sector motor for producing a net torque from two integral independent sources where one can serve as a spare backup or paralleled for double net torque or used alternately for extended life operation. The self-latching sector motor includes a housing, a magnet-shaft assembly, and two pair of electromagnetic poles. The magnet-shaft assembly rotates within the housing. The two pair of electromagnetic poles extend fixedly and radially inwardly from the housing, towards the magnet-shaft assembly. The electromagnetic poles of an associated pair of electromagnetic poles are diametrically and magnetically opposed to each other, and each pair of electromagnetic poles are similarly poled to each other for North and South poles so as to provide the net torque to the magnet-shaft assembly that can be backed-up or doubled. The self-latching torque at the stops is achieved by restraining the magnet-shaft assembly from seeking a position of maximum flux.

16 Claims, 3 Drawing Sheets

SELF-LATCHING SECTOR MOTOR FOR PRODUCING A NET TORQUE THAT CAN BE BACKED-UP OR DOUBLED

1. BACKGROUND OF THE INVENTION

A. Field of the Invention

The embodiments of the present invention relate to a self-latching sector motor, and more particularly, the embodiments of the present invention relate to a self-latching sector motor for producing a net torque from one of two integral sources that may permit either source to be used as the primary torque producer, permits either source to be used redundantly or as a spare backup, permits paralleling sources for doubling output torques, or permits alternate use of sources to avoid overheating effects.

B. Description of the Prior Art

In critical applications, a redundant coil capability is an important asset. A redundant coil capability provides back-up, or when paralleled, doubles net torque.

Numerous innovations for motors have been provided in the prior art, which will be described below in chronological order to show advancement in the art, and which are incorporated herein by reference thereto. Even though these innovations may be suitable for the individual purposes to which they address, nevertheless, they differ from the present invention in that they do not teach a self-latching sector motor for producing a net torque that can be backed-up or doubled.

(1) U.S. Pat. No. 3,761,851 to Nelson.

U.S. Pat. No. 3,761,851 issued to Nelson on Sep. 25, 1973 in U.S. class 335 and subclass 253 teaches a two-pole armature located between two field poles, which provides a direct motion rotary actuator with high starting torque and angular rotation over substantially any angle less than 180°. Latching, non-latching, fail-safe return motion, and tailored torque are a few of the many possible modes of operation. Rotary actuators are widely used devices for providing angular motion over predetermined angles. The most common devices are called rotary solenoids, since they convert linear solenoid action to rotary motion. Rotary solenoids have a number of limitations and undesirable characteristics even though they have been the subject of intensive development and are used in large quantities. Rotary solenoids are inefficient and noisy. Starting torque is low and ending torque is high—just the opposite to that of an ideal device.

(2) U.S. Pat. No. 3,970,980 to Nelson.

U.S. Pat. No. 3,970,980 issued to Nelson on Jul. 20, 1976 in U.S. class 335 and subclass 253 teaches a rotary actuator that has rotation of its rotor over predetermined angles. The rotor is a cylindrical housing in which are cylindrically curved permanently-magnetized poles, spaced-apart at their ends and surrounding a fixed armature. The armature has magnetic arms angularly disposed with respect to each other, which define fixed poles. Coils wound on the fixed poles generate magnetic fields when energized to drive the rotor. A holding coil is provided to hold the rotor stationary when the holding coil is energized. The armature has two, three, or more fixed poles. The actuator is operated in rotor latching or fail-safe return modes. Fixed stop members are used to limit angular rotation of the rotor.

(3) U.S. Pat. No. 4,500,861 to Nelson.

U.S. Pat. No. 4,500,861 issued to Nelson on Feb. 19, 1985 in U.S. class 335 and subclass 253 teaches a sector motor having a rotor that is rotatable to one of three positions in a housing. The rotor carries field magnets surrounding stationary armature poles carried by the housing. An arcuate 90° slot in one end of the housing receives an arcuate 45° arm projecting from the rotor, thereby limiting the rotor to a total angular rotation of 90°. Spaced latching magnets coact in mutual repulsion or attraction or both to latch the rotor at either end of rotor rotation. The motor's inherent magnetic restoring force, assisted by a magnetic detent carried by the housing and rotor and located midway between opposite ends of the 90° slot, latch and prevent vibration of the rotor in a central position between opposite ends of its range of rotation.

(4) U.S. Pat. No. 4,795,929 to Elgass et al.

U.S. Pat. No. 4,795,929 issued to Elgass et al. on Jan. 3, 1989 in U.S. class 310 and subclass 36 teaches a rotary actuator in which there is a freely rotatable permanent magnetic armature between two stators. At least one of the stators produces an asymmetrical magnetic flux field that acts upon the magnetic field of the armature to cause the same to rotate.

(5) U.S. Pat. No. 4,847,526 to Takehara et al.

U.S. Pat. No. 4,847,526 issued to Takehara et al. on Jul. 11, 1989 in U.S. class 310 and subclass 185 teaches an electric motor in which one motor element—either the stator or rotor—has magnetic poles whose effective magnetic width is substantially equal and which span equal center angles. The second motor element has a plurality of armature groups, each of which occupies a phase sector of the motor element formed by dividing the total periphery by a natural number. All of the armatures within an armature group are connected electrically in series and excited with a current of one phase—either an alternating current phase or an equivalent phase generated by commutator action. Within one pole group, the poles have equal widths or different widths.

(6) United States Patent Application Publication Number US 2002/0093265 A1 to Nelson.

United States Patent Application Publication Number US 2002/0093265 A1 published to Nelson on Jul. 18, 2002 in U.S. class 310 and subclass 192 teaches a continuous rotation or a multi-position actuator. The continuous rotation armature has at least two poles spaced-apart from the armature and a third pole that is adjustable in distance from the armature. The multi-position actuator includes a housing, an armature rotatably mounted in the housing, and a series of poles journaled around the armature. There is also a stop arm attached to the armature, which stops the rotation of the armature when the stop arm hits an adjacent stop. These stops are positioned within the housing to limit the rotation of the armature. This multi-position actuator is designed to form either a fail safe actuator or a latching actuator by adjusting the spacing of the air gap between the poles and the armature. The fail safe actuator is designed so that the stop arm attached to the armature is positioned between the stops when the poles are not charged. When the poles are charged, however, the armature rotates so that the stop arm turns to contact one of the adjacent stops. When power is removed, the armature rotates back to its original position, with the stop arm being positioned between the two stops. The latching actuator is designed so that the armature may be positioned at one of three different positions and then remain there when no power is applied to the poles. When power is applied to the poles, however, the armature rotates to the designated position and remains there even after power has been removed.

(7) U.S. Pat. No. 6,518,685 B2 to Nelson.

U.S. Pat. No. 6,518,685 B2 issued to Nelson on Feb. 11, 2003 in U.S. class 310 and subclass 191 teaches a multi-position actuator with three electromagnetic poles, wherein the air gap of selected pole(s) is made different from the remaining pole(s). The multi-position actuator includes a housing, an armature rotatably mounted in the housing, and three poles journaled around the armature. There is also a stop arm attached to the armature, which stops the rotation of the armature when the stop arm hits an adjacent stop. These stops are positioned within the housing to limit the rotation of the armature. This multi-position actuator is designed to form either a fail safe actuator or a latching actuator by adjusting the spacing of the air gap between the poles and the armature. When used with continuous rotation without the stop mechanism, the air gap(s) of the pole(s) can be adjusted in a repetitive manner to produce a useful magnetic torque.

(8) United States Patent Application Publication Number US 2004/0021390 A1 to Kim et al.

United States Patent Application Publication Number US 2004/0021390 A1 published to Kim et al. on Feb. 5, 2004 in U.S. class 310 and subclass 191 teaches a permanent-magnet-type synchronous-rotary-electric machine that includes a stator provided with windings. A rotor, arranged to be supported for rotation in the stator with a gap between the inner surface of the stator and the outer surface thereof is divided into two rotor bodies, each provided with permanent magnets of opposite polarities alternately arranged in a circumferential direction. In switching the permanent-magnet-type synchronous-rotary-electric machine from a motor to a generator, a second rotor body is moved axially relative to a first rotor body to an axial position that makes the intensity of a combined magnetic field created by the permanent magnets lower than that of a combined magnetic field created by the permanent magnets when the second rotor body is located at a predetermined position, and then the second rotor body is moved to the predetermined position.

(9) U.S. Pat. No. 6,967,422 B2 to Nelson.

U.S. Pat. No. 6,967,422 B2 issued to Nelson on Nov. 22, 2005 in U.S. class 310 and subclass 191 teaches a two-position rotary actuator that provides a latching or holding torque that can be adjusted by altering the magnetic properties of a selected pole member. The actuator also functions as a sector motor over a selected range of angular motion, and provides failsafe operation that returns the actuator to a starting position when electrical power is removed.

(10) United States Patent Application Publication Number US 2009/0261680 A1 to Oki et al.

United States Patent Application Publication Number US 2009/0261680 A1 published to Oki et al. on Oct. 22, 2009 in U.S. class 310 and subclass 195 teaches a stator core that includes a plurality of salient pole portions that are formed in a radial shape, are wound with a stator coil, and are disposed at a uniform angle except for a non-equiangular pitch region, a circular outer peripheral yoke formed so as to be continuous with the outer peripheral side of the salient pole portions, a cut-out that is formed by cutting out part of the outer peripheral yoke in an approximate sector-shape except in the non-equiangular pitch region of the salient pole portions, and a compensating pole plate that is provided in the cut-out along the ends on the inner peripheral side of the non-equiangular pitch region where the salient pole portions are formed.

(11) United States Patent Application Publication Number US 2009/0295251 A1 to Vollmer et al.

United States Patent Application Publication Number US 2009/0295251 A1 published to Vollmer et al. on Dec. 3, 2009 in U.S. class 310 and subclass 195 teaches a permanently excited synchronous machine, which includes a rotor and a stand that contains a three-branched winding system that includes tooth coils. The stand has a total of three or six grooves, and a tooth is formed therebetween. A total of three tooth coils are arranged in the grooves, and each coil is associated with one of the three winding phases. The number of user pole pairs is four or five. The rotor has twice as many user pole pairs of permanent magnets that are evenly distributed on the periphery.

It is apparent that numerous innovations for motors have been provided in the prior art, which are adapted to be used. Furthermore, even though these innovations may be suitable for the specific individual purposes to which they address, however, they would not be suitable for the purposes of the embodiments of the present invention as heretofore described, namely, a self-latching sector motor for producing a net torque that can be backed-up or doubled.

2. SUMMARY OF THE INVENTION

Thus, an object of the embodiments of the present invention is to provide a self-latching sector motor for producing a net torque that can be backed-up or doubled, which avoids the disadvantages of the prior art.

Briefly stated, another object of the embodiments of the present invention is to provide a self-latching sector motor for producing a net torque from two integral independent sources where one can serve as a spare backup or paralleled for double net torque or used alternately for extended life operation. The self-latching sector motor includes a housing, a magnet-shaft assembly, and two pair of electromagnetic poles. The magnet-shaft assembly rotates within the housing. The two pair of electromagnetic poles extend fixedly and radially inwardly from the housing, towards the magnet-shaft assembly. The electromagnetic poles of an associated pair of electromagnetic poles are diametrically and magnetically opposed to each other, and each pair of electromagnetic poles are similarly poled to each other for North and South poles so as to provide the net torque to the magnet-shaft assembly that can be backed-up or doubled. The self-latching torque at the stops is achieved by restraining the magnet-shaft assembly from seeking a position of maximum flux.

The novel features considered characteristic of the embodiments of the present invention are set forth in the appended claims. The embodiments of the present invention themselves, however, both as to their construction and their method of operation together with additional objects and advantages thereof will be best understood from the following description of the specific embodiments when read and understood in connection with the accompanying drawing.

3. BRIEF DESCRIPTION OF THE FIGURES OF THE DRAWING

The figures of the drawing are briefly described as follows.

4. LIST OF REFERENCE NUMERALS UTILIZED IN THE DRAWING

Figure 1:
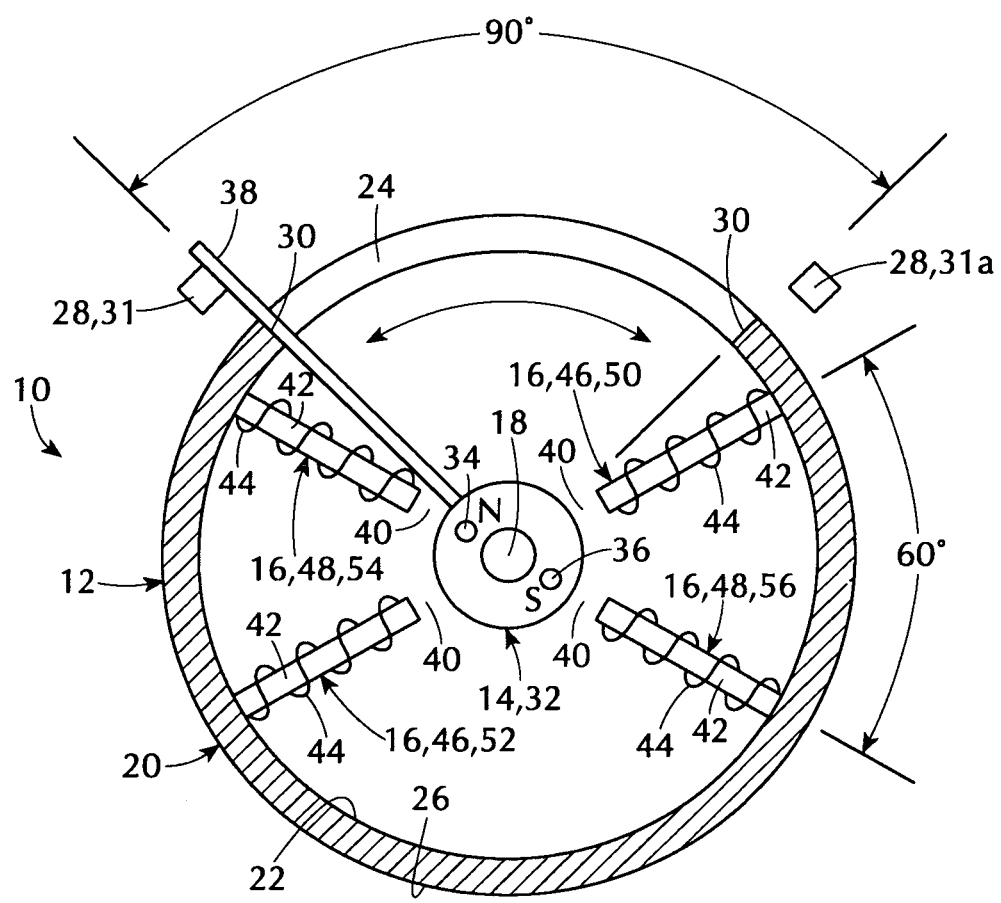
FIG. 1 is a diagrammatic cross sectional view of the self-latching sector motor of the embodiments of the present invention producing a net torque that can be backed-up or doubled.

A. General.
10 self-latching sector motor of embodiments of present invention for producing net torque that can be backed-up or doubled B. Overall Configuration of Self-Latching Sector Motor 10.
12 housing
14 magnet-shaft assembly
16 two pair of electromagnetic poles C. Specific Configuration of Housing 12.
18 central axis of housing 12
20 peripheral wall of housing 12
22 inner surface of peripheral wall 20 of housing 12
24 through slot of peripheral wall 20 of housing 12
26 outer surface of peripheral wall 20 of housing 12
28 pair of stops
30 pair of ends of through slot 24 of peripheral wall 20 of housing 12
31 first stop of pair of stops 28
31a second stop of pair of stops 28

D. Specific Configuration of Magnet-Shaft Assembly 14.
32 magnet of magnet-shaft assembly 14
34 North pole of magnet 32 of magnet-shaft assembly 14
36 South pole of magnet 32 of magnet-shaft assembly 14
38 drive arm of magnet-shaft assembly 14

E. Specific Configuration of Two Pair of Electromagnetic Poles 16.
40 air gaps of two pair of electromagnetic poles 16
42 pole piece of each electromagnetic pole of two pair of electromagnetic poles 16
44 coil of each electromagnetic pole of two pair of electromagnetic poles 16
46 first pair of electromagnetic poles of two pair of electromagnetic poles 16
48 second pair of electromagnetic poles of two pair of electromagnetic poles 16
50 first electromagnetic pole of first pair of electromagnetic poles 46 of two pair of electromagnetic poles 16
52 second electromagnetic pole of first pair of electromagnetic poles 46 of two pair of electromagnetic poles 16
54 first electromagnetic pole of second pair of electromagnetic poles 48 of two pair of electromagnetic poles 16
56 second electromagnetic pole of second pair of electromagnetic poles 48 of two pair of electromagnetic poles 16

5. DETAILED DESCRIPTION OF THE PREFERRED EMBODIMENTS

A. General.

Referring now to the figures, in which like numerals indicate like parts, and particularly to FIG. 1, which is a diagrammatic cross sectional view of the self-latching sector motor of the embodiments of the present invention producing a net torque that can be backed-up or doubled, the self-latching sector motor of the embodiments of the present invention is shown generally at 10 for producing a net torque that can be backed-up or doubled.

The self-latching sector motor 10 produces a net torque from one of two integral sources that may permit either source to be used as the primary torque producer, permits either source to be used redundantly or as a spare backup, permits paralleling sources for doubling output torques, or permits alternate use of sources to avoid overheating effects.

B. The Overall Configuration of the Self-Latching Sector Motor 10.

The self-latching sector motor 10 comprises a housing 12, a magnet-shaft assembly 14, and two pair of electromagnetic poles 16. The magnet-shaft assembly 14 rotates within the housing 12. The two pair of electromagnetic poles 16 extend fixedly and radially inwardly from the housing 12, towards the magnet-shaft assembly 14. The electromagnetic poles of an associated pair of electromagnetic poles 16 are diametrically and magnetically opposed to each other, and each pair of electromagnetic poles 16 are similarly poled to each other for North and South poles so as to provide the net torque to the magnet-shaft assembly 14 that can be backed-up or doubled.

It is to be understood that in an associated pair, either electromagnetic pole source may be used with the other serving as a spare or the electromagnetic poles can be staggered or used alternately for extended life or paralleled for doubling the torque.

C. The Specific Configuration of the Housing 12.

The housing 12 is hollow, generally cylindrically-shaped with a central axis 18, and has a peripheral wall 20.

The peripheral wall 20 of the housing 12 has an inner surface 22, a through slot 24, and an outer surface 26, and the self-latching motor 10 further comprises a pair of stops 28. It is to be understood that the through slot 24 of the peripheral wall 20 of the housing 12 is just one of various ways to introduce the pair of stops 28 into the self-latching motor 10, which can be external, etc.

The through slot 24 of the peripheral wall 20 of the housing 12 terminates at a pair of ends 30, and extends, for example, 90°. It is to be understood that the through slot 24 of the peripheral wall 20 of the housing 12 extending 90° is not to be considered limiting, in that the 90° happens to be convenient for explanation.

The pair of stops 28 are external to the outer surface 26 of the peripheral wall 20 of the housing 12, and comprise a first stop 31 and a second stop 31a. The first stop 31 of the pair of stops 28 is adjacent one end 30 of the through slot 24 of the peripheral wall 20 of the housing 12, and the second stop 31a of the pair of stops 28 is adjacent the other end 30 of the through slot 24 of the peripheral wall 20 of the housing 12, and is spaced 90° from the first stop 31 of the pair of stops 28.

The housing 12 is made of magnetic iron.

D. The Specific Configuration of the Magnet-Shaft Assembly 14.

The magnet-shaft assembly 14 comprises a magnet 32. The magnet 32 of the magnet-shaft assembly 14 is generally doughnut-shaped, rotates about the central axis 18 of the housing 12 so as to be concentric therewith, and is radially magnetic having a North pole 34 and a South pole 36.

It is to be understood that the radially North/South magnet plays a very important part in the self-latching sector motor, and a steel shaft supports the magnet and provides the output torque.

The magnet-shaft assembly 14 further comprises a drive arm 38. The drive arm 38 of the magnet-shaft assembly 14 extends fixedly and radially outwardly from the magnet 32 of the magnet-shaft assembly 14, through the through slot 24 of the peripheral wall 20 of the housing 12, and selectively contacts a respective one of the pair of stops 28, and when contacting a respective one of the pair of stops 28, stops rotation of the magnet-shaft assembly 14, to thereby limit travel of the magnet-shaft assembly 14 to only 90° by virtue of the pair of stops 28 being only 90° apart from each other.

E. The Specific Configuration of the Two Pair of Electromagnetic Poles 16.

The two pair of electromagnetic poles 16 extend fixedly and radially inwardly from the inner surface 22 of the peripheral wall 20 of the housing 12, towards, and short of, the magnet 32 of the magnet-shaft assembly 14 so as to form air gaps 40 therebetween.

Each electromagnetic pole 16 comprises a pole piece 42 and a coil 44 wound around the pole piece 42 of an associated electromagnetic pole 16 so as to selectively magnetize the associated electromagnetic pole 16. The pole piece 42 of each electromagnetic pole 16 extends fixedly and radially inwardly from the inner surface 22 of the peripheral wall 20 of the housing 12, towards, and short of, the magnet 32 of the magnet-shaft assembly 14 so as to form the air gaps 40 therebetween.

One associated pair of electromagnetic poles 16 are spaced 60° from the other associated pair of electromagnetic poles 16.

Each pair of the two pair of electromagnetic poles 16 are similarly magnetized for North and South poles so as to provide the net torque to the magnet-shaft assembly 14 that can be backed-up or doubled.

The two pair of electromagnetic poles 16 comprise a first pair of electromagnetic poles 46 and a second pair of electromagnetic poles 48. The first pair of electromagnetic poles 46 of the two pair of electromagnetic poles 16 comprise a first electromagnetic pole 50 and a second electromagnetic pole 52. The second pair of electromagnetic poles 48 of the two pair of electromagnetic poles 16 comprise a first electromagnetic pole 54 and a second electromagnetic pole 56.

The first electromagnetic pole 50 of the first pair of electromagnetic poles 46 of the two pair of electromagnetic poles 16 and the second electromagnetic pole 52 of the first pair of electromagnetic poles 46 of the two pair of electromagnetic poles 16 are diametrically opposed, and when energized, oppositely poled to each other where either electromagnetic pole can be used to provide net torque, or one may be a spare for redundancy backup or suitably paralleled for double torque for clockwise rotation of the magnet-shaft assembly 14.

The first electromagnetic pole 54 of the second pair of electromagnetic poles 48 of the two pair of electromagnetic poles 16 and the second electromagnetic pole 56 of the second pair of electromagnetic poles 48 of the two pair of electromagnetic poles 16 are diametrically opposed, and when energized, oppositely poled to each other where either electromagnetic pole can be used to provide net torque, or one may be a spare for redundancy backup or suitably paralleled for double torque for counter-clockwise rotation of the magnet-shaft assembly 14.

F. The Operation of the Self-Latching Sector Motor 10.

Figure 2:
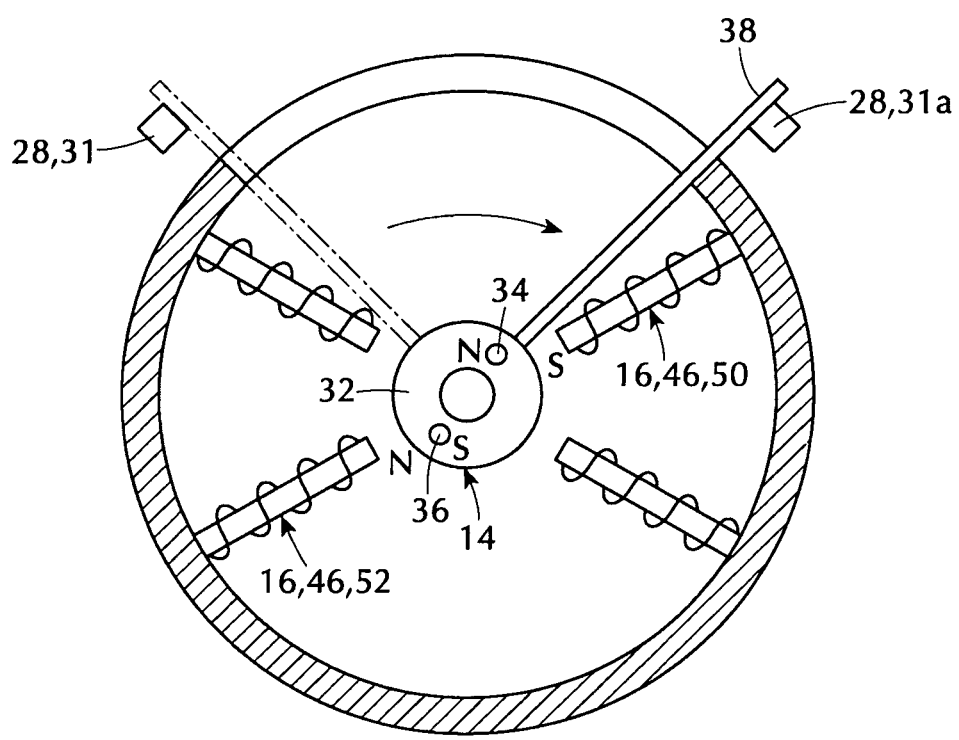
FIG. 2 is a diagrammatic cross sectional view of the self-latching sector motor of the embodiments of the present invention producing a clockwise net torque that can be backed-up or doubled.

As shown in FIG. 2, the self-latching sector motor 10 produces a clockwise net torque from the first electromagnetic pole 50 of the first pair of electromagnetic poles 46 of the two pair of electromagnetic poles 16 when energized as a South pole which repels the South pole 36 of the magnet 32 of the magnet-shaft assembly 14 and attracts the North pole 34 of the magnet 32 of the magnet-shaft assembly 14 resulting in a clockwise rotation or similar net torque from the second electromagnetic pole 52 of the first pair of electromagnetic poles 46 of the two pair of electromagnetic poles 16 when energized as a North pole repelling the North pole 34 of the magnet 32 of the magnet-shaft assembly 14 and attracting the South pole 36 of the magnet 32 of the magnet-shaft assembly 14 to produce a clockwise rotation where either pole can be considered a backup or paralleled for double net torque.

Figure 3:
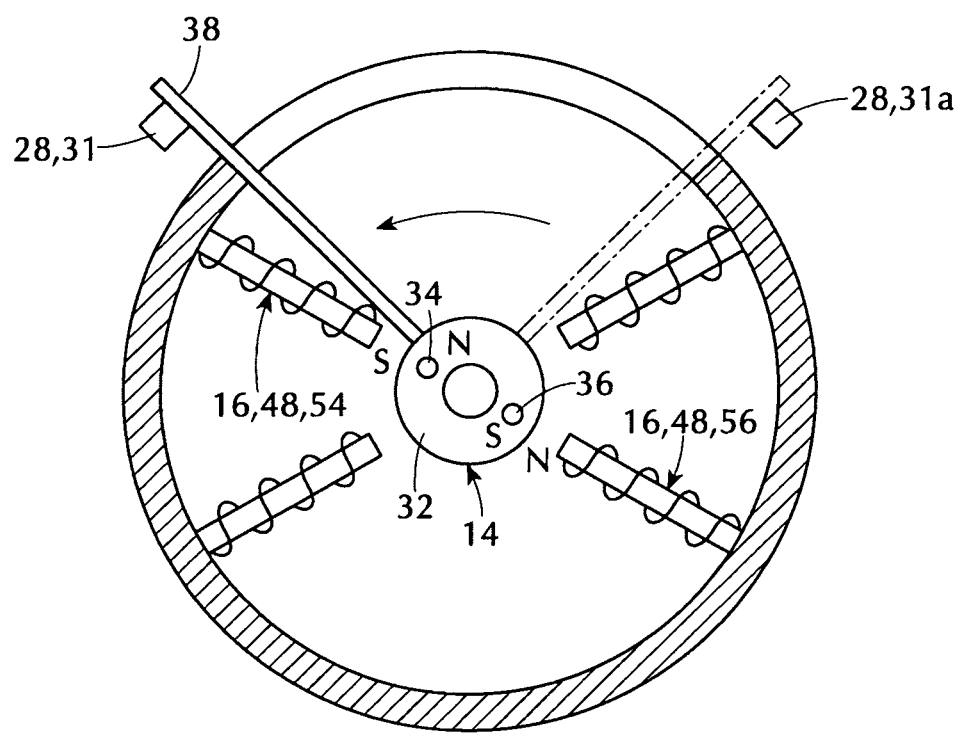
FIG. 3 is a diagrammatic cross sectional view of the self-latching sector motor of the embodiments of the present invention producing a counterclockwise net torque that can be backed-up or doubled.

As shown in FIG. 3, the self-latching sector motor 10 produces a counter-clockwise net torque from the second electromagnetic pole 54 of the second pair of electromagnetic poles 48 of the two pair of electromagnetic poles 16 when energized as a South pole which repels the South pole 36 of the magnet 32 of the magnet-shaft assembly 14 and attracts the North pole 34 of the magnet 32 of the magnet-shaft assembly 14 resulting in a counter-clockwise rotation or similar net torque from the second electromagnetic pole 56 of the second pair of electromagnetic poles 48 of the two pair of electromagnetic poles 16 when energized as a North pole repelling the North pole 34 of the magnet 32 of the magnet-shaft assembly 14 and attracting the South pole 36 of the magnet 32 of the magnet-shaft assembly 14 to produce a counter-clockwise rotation where either pole can be considered a backup or paralleled for double net torque.

Since the magnet-shaft assembly 14 indirectly seeks a position of maximum flux, i.e., 180°, and is prevented from rotating to that position by the pair of stops 28, there is an indirect latching torque at the pair of stops 28 when all electrical drive power is removed. Thus, the self-latching sector motor 10 is self-latching at the pair of stops 28 and has an indirect flip action at a midpoint position of the 90° spacing of the pair of stops 28.

G. Impressions.

It will be understood that each of the elements described above or two or more together may also find a useful application in other types of constructions differing from the types described above.

While the embodiments of the present invention have been illustrated and described as embodied in a self-latching sector motor for producing a net torque that can be backed-up or doubled, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A self-latching sector motor whose net torque is provided by two identical apparatuses where one can be a spare backup, or each apparatus could be operated sequentially to extend life or paralleled for double torque, comprising:
   a) a housing;
   b) a magnet-shaft assembly;
   c) two pair of electromagnetic poles; and
   d) a pair of stops;
   wherein said magnet-shaft assembly is magnetized radially North-South;
   wherein said magnet-shaft assembly rotates within said housing;
   wherein said two pair of electromagnetic poles extend fixedly and radially inwardly from said housing, towards said magnet-shaft assembly;
   wherein said electromagnetic poles of an associated pair of electromagnetic poles are diametrically and magnetically opposed to each other which is common to both pairs to react to said magnet-shaft assembly producing net torque, and each pair of electromagnetic poles are similarly poled to each other for North and South poles so as to provide the net torque to said magnet-shaft assembly that can be backed-up or doubled;

wherein said housing is hollow;
wherein said housing is generally cylindrically-shaped;
wherein said housing has a central axis;
wherein said housing has a peripheral wall;
wherein said peripheral wall of said housing has an inner surface;
wherein said peripheral wall of said housing has a through slot;
wherein said peripheral wall of said housing has an outer surface; and
wherein said through slot of said peripheral wall of said housing terminates at a pair of ends.

2. The motor of claim 1, wherein said housing is made of magnetic iron.

3. The motor of claim 1, wherein one associated pair of electromagnetic poles are spaced from the other associated pair of electromagnetic poles.

4. The motor of claim 1, wherein each pair of said two pair of electromagnetic poles are similarly magnetized for North and South poles so as to provide the net torque to said magnet-shaft assembly that can be backed-up or doubled.

5. The motor of claim 1, wherein said pair of stops are external to said outer surface of said peripheral wall of said housing;
wherein said pair of stops comprise a first stop;
wherein said pair of stops comprise a second stop;
wherein said first stop of said pair of stops is adjacent one end of said through slot of said peripheral wall of said housing;
wherein said second stop of said pair of stops is adjacent the other end of said through slot of said peripheral wall of said housing; and
wherein said second stop of said pair of stops is spaced from said first stop of said pair of stops.

6. The motor of claim 5, wherein since said magnet-shaft assembly indirectly seeks a position of maximum flux of 180° and is prevented from rotating to that position by said pair of stops, there is an indirect latching torque at said pair of stops when all electrical drive power is removed, to thereby allow said self-latching sector motor to be self-latching at said pair of stops and have an indirect flip action at a midpoint position of the 90° spacing of said pair of stops.

7. The motor of claim 5, wherein said magnet-shaft assembly comprises:
a) a magnet; and
b) a shaft;
wherein said magnet of said magnet-shaft assembly is generally doughnut-shaped;
wherein said magnet of said magnet-shaft assembly rotates about said central axis of said housing so as to be concentric therewith;
wherein said magnet of said magnet-shaft assembly is magnetized radially with a North pole and a South pole;
wherein said shaft of said magnet-shaft assembly supports said magnet of said magnet-shaft assembly; and
wherein said shaft of said magnet-shaft assembly provides output torque.

8. The motor of claim 7, wherein said two pair of electromagnetic poles extend fixedly and radially inwardly from said inner surface of said peripheral wall of said housing;
wherein said two pair of electromagnetic poles extend towards said magnet of said magnet-shaft assembly; and
wherein said two pair of electromagnetic poles extend short of said magnet of said magnet-shaft assembly so as to form air gaps therebetween.

9. The motor of claim 7, wherein each electromagnetic pole comprises a pole piece;
wherein each electromagnetic pole comprises a coil;
wherein said coil of each electromagnetic pole is wound around said pole piece of an associated electromagnetic pole so as to selectively magnetize said associated electromagnetic pole;
wherein said pole piece of each electromagnetic pole extends fixedly inwardly from said inner surface of said peripheral wall of said housing;
wherein said pole piece of each electromagnetic pole extends radially inwardly from said inner surface of said peripheral wall of said housing;
wherein said pole piece of each electromagnetic pole extends towards said magnet of said magnet-shaft assembly; and
wherein said pole piece of each electromagnetic pole extends short of said magnet of said magnet-shaft assembly so as to form said air gaps therebetween.

10. The motor of claim 7, wherein said shaft of said magnet-shaft assembly is made from stainless steel.

11. The motor of claim 7, wherein said magnet-shaft comprises a drive arm;
wherein said drive arm of said magnet-shaft assembly extends fixedly outwardly from said magnet of said magnet-shaft assembly;
wherein said drive arm of said magnet-shaft assembly extends radially outwardly from said magnet of said magnet-shaft assembly;
wherein said drive arm of said magnet-shaft assembly extends through said through slot of said peripheral wall of said housing; and
wherein said drive arm of said magnet-shaft assembly selectively contacts a respective one of said pair of stops, and when contacting a respective one of said pair of stops, stops rotation of said magnet-shaft assembly, to thereby limit travel of said magnet-shaft assembly to only 90° by virtue of said pair of stops being only 90° apart from each other.

12. The motor of claim 11, wherein said two pair of electromagnetic poles comprise a first pair of electromagnetic poles;
wherein said two pair of electromagnetic poles comprise a second pair of electromagnetic poles;
wherein said first pair of electromagnetic poles of said two pair of electromagnetic poles comprise a first electromagnetic pole;
wherein said first pair of electromagnetic poles of said two pair of electromagnetic poles comprise a second electromagnetic pole;
wherein said second pair of electromagnetic poles of said two pair of electromagnetic poles comprise a first electromagnetic pole; and
wherein said second pair of electromagnetic poles of said two pair of electromagnetic poles comprise a second electromagnetic pole.

13. The motor of claim 12, wherein said first electromagnetic pole of said first pair of electromagnetic poles of said two pair of electromagnetic poles and said second electromagnetic pole of said first pair of electromagnetic poles of said two pair of electromagnetic poles are diametrically opposed to each other;
wherein said first electromagnetic pole of said first pair of electromagnetic poles of said two pair of electromagnetic poles and said second electromagnetic pole of said first pair of electromagnetic poles of said two pair of electromagnetic poles are magnetically poled opposite to each other; and wherein said first electromagnetic pole of said first pair of electromagnetic poles of said two pair of electromagnetic poles and said second electromagnetic pole of said first pair of electromagnetic poles of said two pair of electromagnetic poles form an equal net torque capability or where one pole can serve as the spare backup or both paralleled for double torque.

14. The motor of claim 12, wherein said first electromagnetic pole of said second pair of electromagnetic poles of said two pair of electromagnetic poles and said second electromagnetic pole of said second pair of electromagnetic poles of said two pair of electromagnetic poles are diametrically opposed to each other;

wherein said first electromagnetic pole of said second pair of electromagnetic poles of said two pair of electromagnetic poles and said second electromagnetic pole of said second pair of electromagnetic poles of said two pair of electromagnetic poles are magnetically poled opposite to each other; and wherein said first electromagnetic pole of said second pair of electromagnetic poles of said two pair of electromagnetic poles and said second electromagnetic pole of said second pair of electromagnetic poles of said two pair of electromagnetic poles form an equal net torque capability or where one pole can serve as the spare backup or both paralleled for double torque.

15. The motor of claim 12, wherein when each pole of an associated pair of poles is magnetically energized to be a South pole, said South pole repels said South pole of said magnet-shaft assembly and attracts said North pole of said magnet-shaft assembly, to thereby cause said drive arm of said magnet-shaft assembly to rotate clockwise from said first stop of said pair of stops to said second stop of said pair of stops, to thereby allow said first electromagnetic pole of said first pair of electromagnetic poles of said two pair of electromagnetic poles and said second electromagnetic pole of said first pair of electromagnetic poles of said two pair of electromagnetic poles to be equally effective in providing a clockwise torque to said magnet-shaft assembly so as to back-up each other, and when both energized, doubles the net torque.

16. The motor of claim 12, wherein when wherein when each pole of an associated pair of poles is magnetically energized to be a South pole, said South pole repels said South pole of said magnet-shaft assembly and attracts said North pole of said magnet-shaft assembly, to thereby cause said magnet-shaft assembly to rotate counterclockwise from said second stop of said pair of stops to said first stop of said pair of stops, to thereby allow said first electromagnetic pole of said second pair of electromagnetic poles of said two pair of electromagnetic poles and said second electromagnetic pole of said second pair of electromagnetic poles of said two pair of electromagnetic poles to be equally effective in providing a counterclockwise torque to said magnet-shaft assembly so as to back-up each other, and when both energized, doubles the net torque.

* * * * *